United States Patent [19]
Koch

[11] Patent Number: 5,232,189
[45] Date of Patent: Aug. 3, 1993

[54] PLIABLE WIRE SOAP HOLDER

[76] Inventor: Douglas J. Koch, 5138 Plank Rd., Fremont, Ohio 43420

[21] Appl. No.: 692,019

[22] Filed: Apr. 26, 1991

[51] Int. Cl.$^5$ ............................................. F16B 47/00
[52] U.S. Cl. .................. 248/309.1; 248/206.3; 248/683; 248/302; 248/153; 211/106
[58] Field of Search ............... 248/309.1, 302, 911, 248/205.5, 206.1, 206.2, 206.3, 303, 683, 153; 211/106, 119, 181; D6/525, 529, 536–540

[56] References Cited

U.S. PATENT DOCUMENTS

| Re. 21,391 | 3/1940 | Holden | 246/206.3 |
|---|---|---|---|
| D. 64,859 | 6/1924 | Mosgrove | D6/537 |
| 305,860 | 9/1884 | Taylor | 248/303 |
| 2,568,714 | 9/1951 | Britton | 248/206.3 |
| 2,600,755 | 6/1952 | Greensfelder | 211/106 X |
| 2,615,576 | 10/1952 | Dahlgren | 211/181 X |
| 3,137,086 | 6/1964 | James | 248/302 |
| 3,532,225 | 10/1970 | Reed | 211/181 |
| 4,779,829 | 10/1988 | Rocke | 248/302 |
| 5,014,860 | 5/1991 | Emery | 248/206.3 |
| 5,039,046 | 8/1991 | Brewster | 248/206.3 |

*Primary Examiner*—Alvin C. Chin-Shue
*Attorney, Agent, or Firm*—Jerry Semer

[57] ABSTRACT

The invention is a wire frame which is bent in an "S" like formation to form a soap holder for two bars of soap. The top of the "S" frame being slightly concave to allow a bar of soap to set on the top. Two suction cups are attached to the frame to allow the soap holder to be attached to a wall or sink. The frame is make out of a pliable wire so that the end user can modify the frame to fit his sink. The soap dish holder is prepared by a method of wrapping a pliable wire around post on the jig and spot welding the wire at the point at which the wire comes in contact with itself and than dipping the wire in a plastic coating and shaping the wires so it can hold the two bars of soap. Lastly suction cups are added to the wore frame so that it can be attached to a wall or sink.

8 Claims, 3 Drawing Sheets

PLIABLE WIRE SOAP HOLDER

FIELD OF THE INVENTION

This invention relates to a mountable soap dish holder and more particularly to a mountable soap dish holder made out of wire.

BACKGROUND OF THE INVENTION

One of the biggest problems with most soap dish holders is that they allow water to collect and stand within them. When the soap bar is then placed within the holder the water soften and dissolve the bar of soap and thus the bar does not last long. To eliminate this problem, soap dishes as found in E. L. Dennis U.S. Pat. No. 1,608,928 and I. Morse U.S. Pat. No. 2,560,699 were made out of wire. Both of these patents however show a very complicated wire form soap dish. These forms would be expensive to manufacture. Also neither of these holder are design to carry two bar. Another problem with soap dish holders constructed out of wire or other metal or plastics are that the individual using the holder can not modify the holder to fit on several different sink design. The two above mention patents with the wire soap dish holders clearly can not be modify to fit the many different types and shapes of sink.

Another problem that plague soap dish holder is that it is very difficult to build a holder that can be held in place on the vertical surface of a sink. One of the ways inventors have attempted to do this is to use a suction cup to fit on to the vertical surface of the sink. The problem with this method is that by placing the soap dish horizontal to the wall, the holder put torque upon the suction cup and the suction cup does not stay in place well. Attempts to solve this problem can be shown in P. P. Pierce U.S. Pat. No. 1,146,275 and W. S. Weiant, Jr. U.S. Pat. No. 2,044,520. In both of these patents to counteract the torque placed on the suction cups by the soap dish being horizontal to plane of the wall, a support rod is attached to the holder and holds the holder away from the wall. These support rods make the invention more expensive to manufacture. It is an object of this invention to devise a soap dish which will not allow water to stand within it causing the soap to dissolve and become mush and thus wasting soap. It is the further object of the invention to invent a light weight holder that can hold two bars of soap. Another objective of this invention to produce a soap dish holder that can easily be modify by the user to make it fit the user's sink design. It is also the objective of this invention to build a soap dish holder that is inexpensive to manufacture and attractive. The feature that make this invention possible are light weight pliable wire that can be dip in a plastic coating. An additional feature of this invention is the method of manufacture of the soap dish holder which allows the holder to be manufactured easily and inexpensively.

The advantages of the invention are that water will not be able to collect within the soap dish holder thus there will be no water to dissolve the soap when the soap is in the holder. Also the inventor soap dish is design to hold two bars of soap effectively against the vertical side of a sink. A further advantage of this invention is that the soap dish holder can be modify by the user so that they can make it fit the type of sink the user has. Another advantage of this invention is that the inventor has devise a way to easily and inexpensively manufacture his invention.

SUMMARY OF THE INVENTION

The invention is basically a wire frame which is bent in an "S" like formation to form a soap holder for two bars of soap. The top of the "S" frame being slightly concave to allow a bar of soap to set on the top. Two suction cups are attached to the frame to allow the soap holder to be attached to a wall or sink. The frame is make out of a pliable wire so that the end user can modify the frame to fit his sink. The soap dish holder is prepared by a method of wrapping a pliable wire around post on the jig and spot welding the wire at the point at which the wire comes in contact with itself and than dipping the wire in a plastic coating and shaping the wires so it can hold the two bars of soap. Lastly suction cups are added to the wire frame so that it can be attached to a wall or sink.

DETAILED DESCRIPTION OF THE PREFERRED EMBODIMENT

Figure 1:
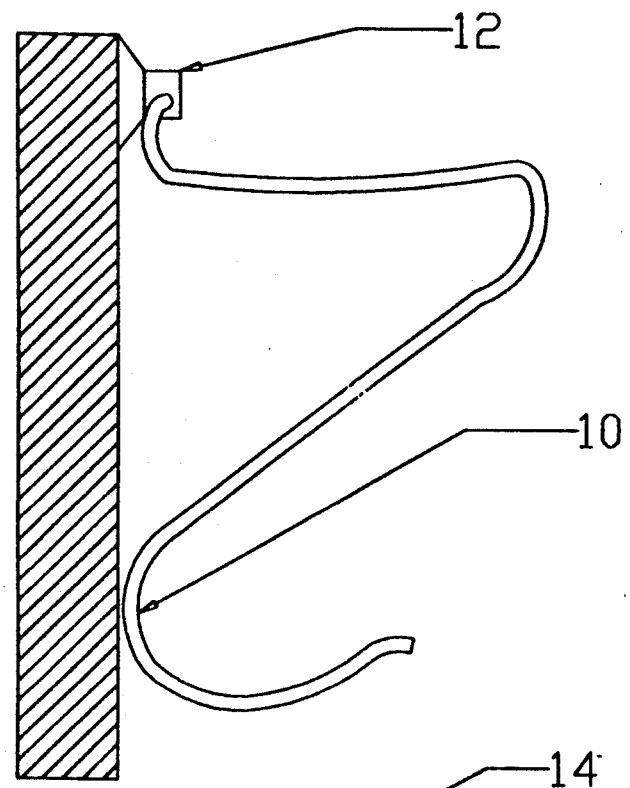
FIG. 1 is a side view of the invention against a vertical wall.
Figure 2:
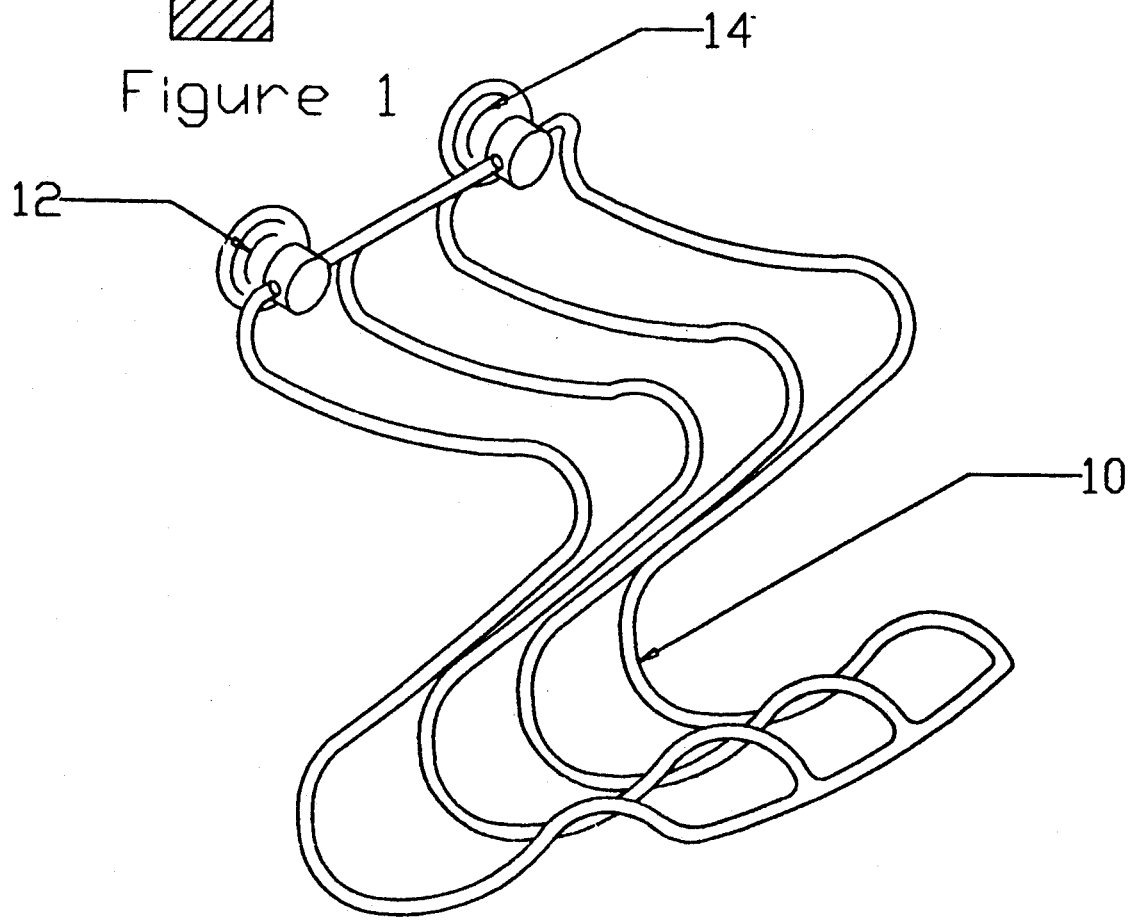
FIG. 2 is a perspective view of the invention for a wall.
Figure 3:
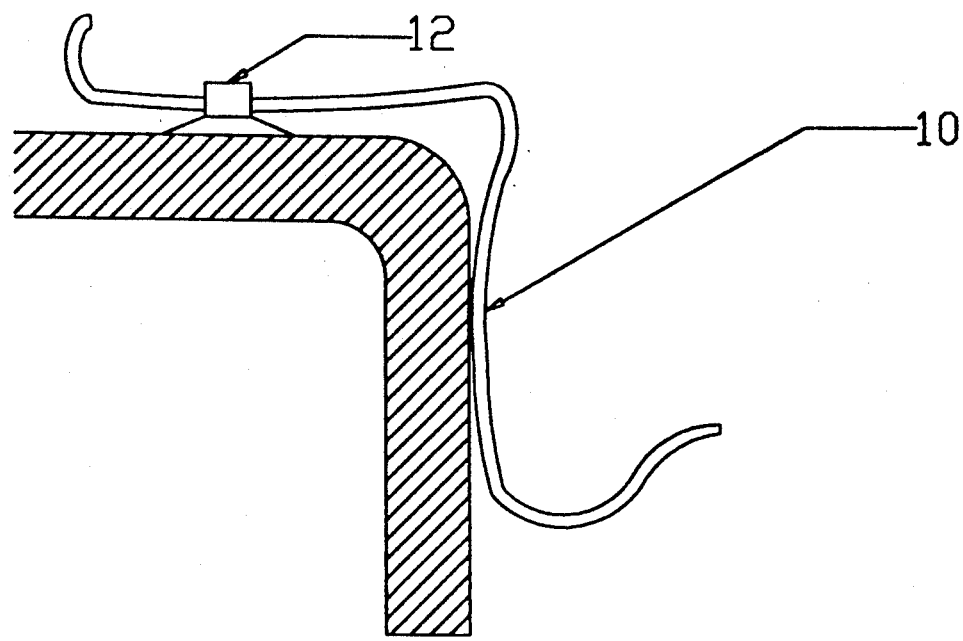
FIG. 3 is a side view of the invention on a sink.
Figure 4:
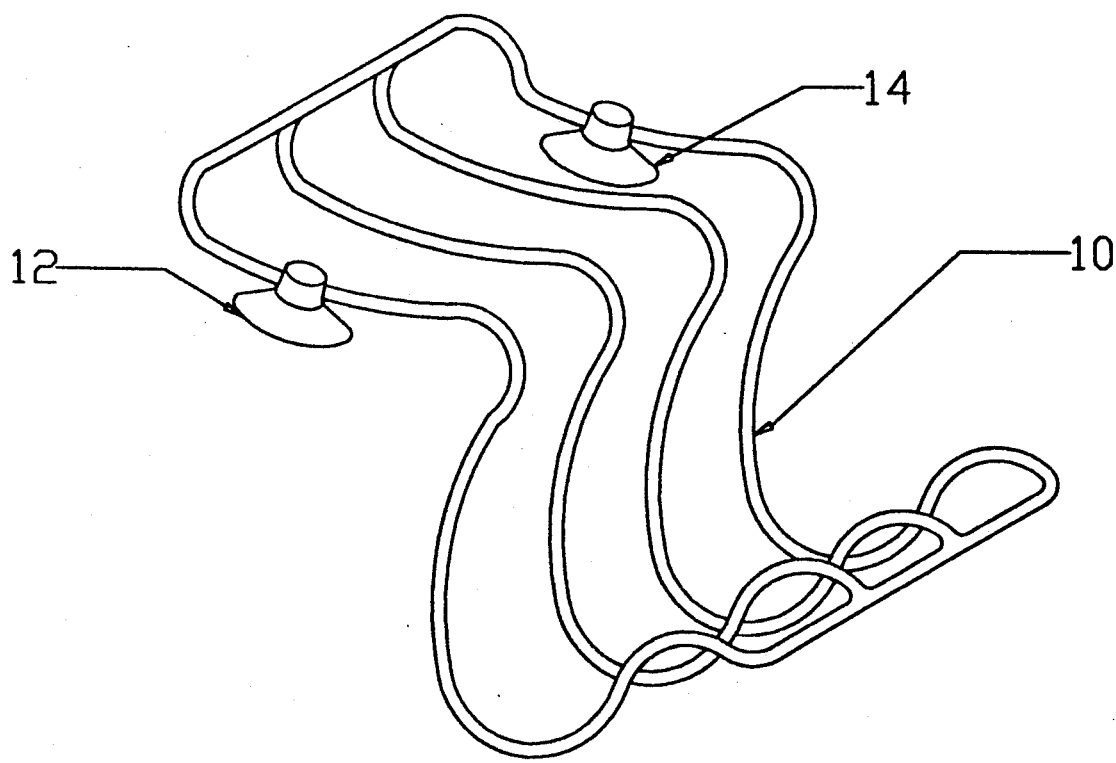
FIG. 4 is a perspective view of the invention for a sink.

The invention is basically a wire frame 10 which is bent in a "S" like formation to form a soap holder for two bars of soap. FIG. 1 shows the invention adapted to fit on a vertical wall. In this configuration two suction cups 12 and 14 are placed on the end of the wire frame so that it can be easily attached to a wall as shown in FIG. 2. FIG. 4 shows the invention adapted for a sink. In this embodiment the suction cups are move down the sides of the wire frame so that it can be attached to a horizontal surface for a sink as shown in FIG. 4.

Figure 5:
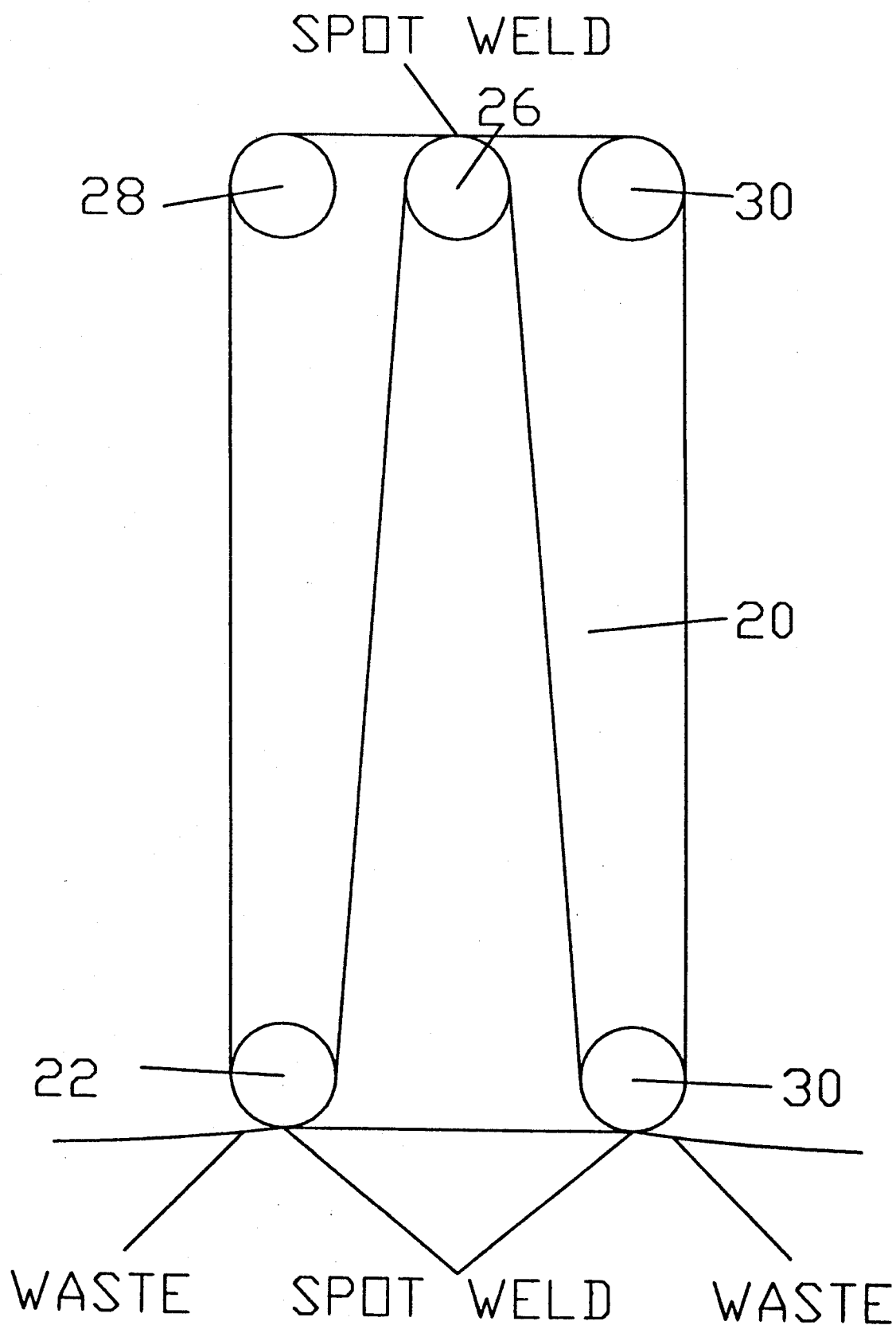
FIG. 5 is a view of the jig for making the invention with the wire wrap around the invention.

FIG. 5 shows how simply the invention can be made. The invention is made on a jig 20 that has five posts 22, 24, 26, 28, and 30. One starts by wrapping the wire around one of the bottom post 22 or 30. Then the wire is wrap around the middle top post 26 and then one brings the wire downward and wrap it around the other bottom post. The wire then is carried upward and is wrap around all three of the top posts 26, 28 and 30 and then continue downward and wrap all the way around to post 30 or 22 again. The wire is then spot welded at the beginning and the end of the wire at posts 22 and 30 and at the top middle post 26. The wire is then dip in plastic to make it rust proof and then bent into the proper shape for the soap dish holders. Two suction cups 12 and 14 are then added to the invention.

FIGS. 2 and 4 show the shape of the invention the wire frame is basically the same shape for the soap dish holder on a vertical wall as it is for a soap dish holder attached to a horizon surface or a sink. The wire is formed in to an "S" like shape with the top part of "S" being slightly concave. This enable a bar of soap to fit at the top portion of the S. A bar of soap fits in the bottom curve of the S for both the sink holder and the vertical wall holder. One of the great advantage of this soap dish holder is due to the fact that it is made out of pliable wire and can be form by the end user into the form which best suit the end user's sink. Also because it is made out of wire, the soap on the dish easily dries and no water is held in the soap holder to dissolve the soap.

I claim:

1. A soap dish comprising:
   a. a pliable wire shaped to form a grill structure containing at least two loops said structure is bent in a "S" shape with a top of the "S" being slightly concave to allow a bar of soap to set on top and the bottom of the "S" is adapted to hold another bar; and,
   b. suction cups attached to the grill structure to fasten said soap dish to a horizontal surface such as a sink top or a vertical surface such as a wall.

2. A soap dish as in claim 1 wherein:
   a. a singular length of wire is bent and joined to provide the grill structure.

3. A soap dish as in claim 1 wherein:
   a. the grill structure has three loops.

4. A soap dish as in claim 1 wherein:
   a. the wire is pliable enough that an end user can modified said grill structure to fit the end user's sink.

5. A soap dish as in claim 3 wherein:
   a. the wire is plastic coated.

6. A soap dish as in claim 1 wherein:
   a. two suction cups are attached to the top of the "S" to fasten said soap dish to a vertical surface such as a wall or a horizontal surface such as a sink top.

7. A soap dish as in claim 1 wherein:
   a. the two suction cups can be moved to different position along the top of the "S" by an end user so that the soap dish can be adapted to attach to a horizontal surface such as a sink top or a vertical surface such as a wall.

8. A soap dish consist essentially of:
   a. a single length of pliable wire which is shaped to form a grill structure with at least two loops said structural is bent in a "S" shape with the top of the "S" shape being slightly concave to allow a bar of soap to set on the top and the bottom of the "S" is adapted to hold another bar; and,
   b. suction cups attached to the top of the "S" to fasten the soap dish to a vertical surface such as a wall or a horizontal surface such as a sink top.

* * * * *